United States Patent
Aubarede et al.

(10) Patent No.: US 6,854,720 B2
(45) Date of Patent: *Feb. 15, 2005

(54) STRUT FOR A MACPHERSON-TYPE WHEEL SUSPENSION

(75) Inventors: Francis Aubarede, Pontgibaud (FR); Antoine Ducloux, La-Roche-Blanche (FR)

(73) Assignee: Compagnie Generale des Etablissements Michelin-Michelin & Cie, Clermont-Ferrand (FR)

(*) Notice: Subject to any disclaimer, the term of this patent is extended or adjusted under 35 U.S.C. 154(b) by 0 days.

This patent is subject to a terminal disclaimer.

(21) Appl. No.: 10/650,283

(22) Filed: Aug. 28, 2003

(65) Prior Publication Data

US 2004/0036204 A1 Feb. 26, 2004

Related U.S. Application Data

(63) Continuation of application No. 09/673,759, filed as application No. PCT/FR00/00302 on Feb. 9, 2000, now Pat. No. 6,612,553.

(30) Foreign Application Priority Data

Feb. 19, 1999 (FR) .......................................... 99 02075

(51) Int. Cl.$^7$ .............................................. B60G 11/56
(52) U.S. Cl. .................. 267/34; 267/177; 267/179; 267/220; 280/124.151; 280/124.179
(58) Field of Search .......................... 267/34, 175, 176, 267/177, 179, 180, 220, 222, 286; 280/124.146, 124.151, 124.179, 124.175, 43; 188/321.11

(56) References Cited

U.S. PATENT DOCUMENTS

| 3,717,354 | A | | 2/1973 | Ritter |
| 3,797,852 | A | | 3/1974 | Patterson et al. |
| 4,474,363 | A | | 10/1984 | Numazawa et al. |
| 5,947,459 | A | * | 9/1999 | Ducloux et al. ............ 267/221 |
| 5,947,549 | A | | 9/1999 | Finley |
| 6,247,688 | B1 | | 6/2001 | De Fontenay et al. |
| 6,612,553 | B1 | * | 9/2003 | Aubarede et al. ............ 267/34 |

FOREIGN PATENT DOCUMENTS

| DE | 893760 | 10/1953 |
| DE | 4021314 | 5/1991 |
| DE | 4110471 | 10/1991 |
| EP | 0780250 | 6/1997 |
| FR | 1044393 | 11/1953 |
| FR | 2297150 | 8/1976 |
| JP | 9100858 | 4/1997 |

* cited by examiner

Primary Examiner—Matthew C. Graham
Assistant Examiner—Mariano Sy
(74) Attorney, Agent, or Firm—Fitzpatrick, Cella, Harper & Scinto

(57) ABSTRACT

The invention concerns a shock strut for a MacPherson wheel suspension comprising a shock absorber with a body (21) and a rod (22). A coil spring (24) is mounted on a lower spring retainer (23) integral with the shock absorber body (21). The first turn of the spring (24) of the MacPherson strut can be immobilized on and relative to the lower spring retainer (23) in various predetermined positions on the lower spring retainer (23).

10 Claims, 3 Drawing Sheets

STRUT FOR A MACPHERSON-TYPE WHEEL SUSPENSION

RELATED APPLICATIONS

The present application is a continuation of U.S. patent application Ser. No. 09/673,759 filed Jan. 22, 2001 (now U.S. Pat. No. 6,612,553 B1), which is a National Stage of International Application No. PCT/FR00/00302, filed Feb. 9, 2000.

BACKGROUND OF THE INVENTION

Field of the Invention

The invention relates to a strut for a wheel suspension of the MacPherson type, comprising a shock absorber with a body and a rod. The rod is surrounded by a coil spring. The coil spring is mounted preloaded between a bottom seat of a lower spring retainer secured to the shock absorber body and an upper seat of an upper spring retainer through which the shock absorber rod passes. The shock absorber body is mounted securely to a hub carrier defining an axis of rotation of the wheel.

Document EP-O 780 250 A2 and U.S. Pat. No. 5,947,459 describe a precise adjustment of a MacPherson suspension strut, using adjusting means arranged on the strut and preferably employing an appropriate measurement bench. To obtain correct operation of the strut, the shear force applied to the shock absorber rod has to be precisely controlled. To achieve this, it is known practice for the axis of the spring to be inclined with respect to the axis of the shock absorber rod with an inclination that is calculated to minimize the shear force on the shock absorber rod. However, it is also known that the resultant of the forces exerted by the spring is liable to exert a moment about the pivot axis, which moment has to be well controlled.

SUMMARY OF THE INVENTION

One object of the invention is to provide a new strut that allows for quick and precise adjustment and which is simple and economical to manufacture.

In order to achieve this objective, the present invention provides a strut for a wheel suspension of the MacPherson type, comprising a shock absorber with a body and a rod surrounded by a coil spring. The coil spring is mounted between a lower spring retainer that is secured to the shock absorber body and an upper spring retainer through which the shock absorber rod passes. The shock absorber body is securely mounted to a hub carrier defining an axis of rotation of the wheel. The strut comprises means for immobilizing the first turn of the spring on and with respect to the lower spring retainer in various predetermined positions on the lower spring retainer.

The spring has one end that extends transversely to a direction of translation defined by the various predetermined positions and has a part which is roughly straight and parallel to the direction of translation.

In a first alternative form of the invention, the end of the spring extends transversely to the direction of translation and has an indexing configuration.

In a first embodiment of this first alternative form, this indexing configuration involves at least one orifice through which a mechanical means of connection to the lower spring retainer can pass.

In a second embodiment of this first alternative form, this indexing configuration involves at least one curved end which can be inserted in an indexing orifice chosen from a number of orifices made in the lower spring retainer.

In a second alternative form of the invention, corresponding to a third embodiment, the end of the spring extends transversely to the direction of translation and can be secured to the lower spring retainer by a means at least partially surrounding said end. This means at least partially surrounding the end of the spring is advantageously configured as a collar or a curved tab. This collar or curved-tab configuration has a means of attachment by a mechanical coupling means to the lower spring retainer.

In both alternative forms of the invention, the mechanical means of coupling to the lower spring retainer is preferably a replaceable means and can be of the screw, pin, bolt or similar type.

In a preferred embodiment, the straight part parallel to the direction of translation is parallel to the direction of forward travel of a vehicle for which the strut is intended.

It is to be understood that both the foregoing general description and the following detailed description are exemplary and explanatory only and are not restrictive of the invention, as claimed.

The accompanying drawings, which are incorporated in and constitute a part of this specification, illustrate various embodiments of the invention and together with the description, serve to explain the principles of the invention.

DETAILED DESCRIPTION OF THE INVENTION

Reference will now be made in detail to the present invention.

Figure 1:
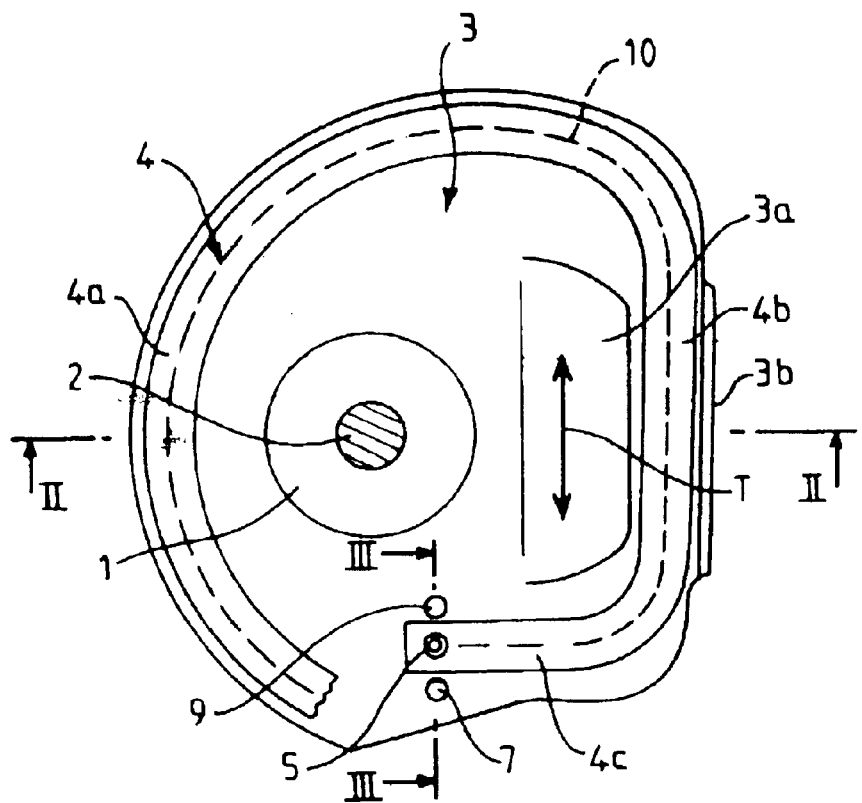
FIG. 1 diagrammatically depicts a view from above in the direction of arrow I of FIG. 2 of a first embodiment of the invention.
Figures 2, 3:
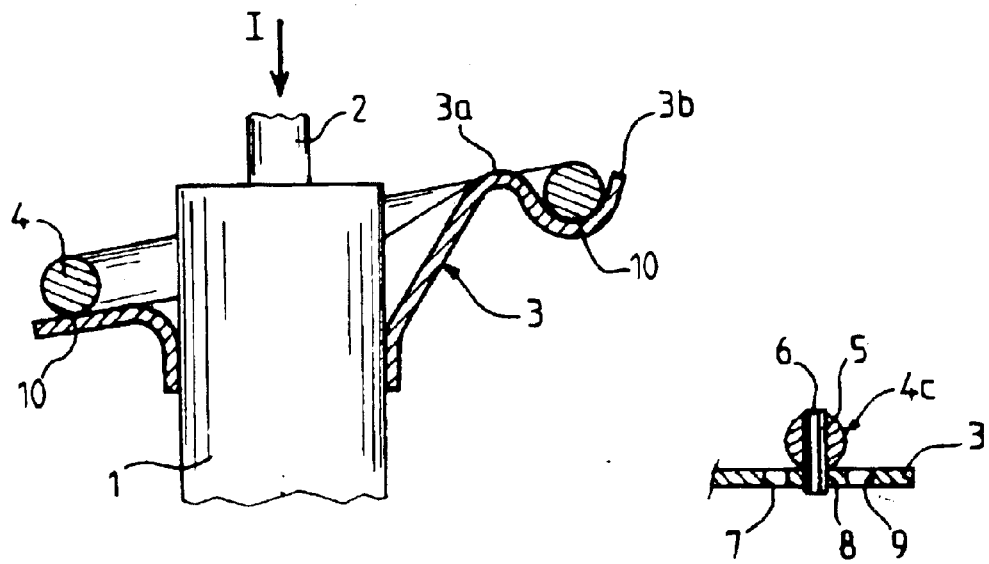
FIG. 2 diagrammatically depicts a view in section on the line II—II of FIG. 1 of the first embodiment of the invention.
FIG. 3 diagrammatically depicts a view in section on the line III—III of FIG. 1 of the first embodiment of the invention.

FIGS. 1 to 3 illustrate a MacPherson suspension strut comprising a shock absorber with a body 1 and a rod 2. A lower spring retainer 3 is mounted securely on the body of the shock absorber and a spring 4 is mounted between the lower spring retainer 3 and an upper spring retainer, not depicted.

The coil spring 4 has a helical part 4a, a straight part 4b guided in translation in a configuration 3a, 3b forming a channel for translation in the direction T.

One end 4c of the spring, curved transversely with respect to the straight part 4b, is roughly perpendicular to this straight part 4b. The end 4c therefore extends transversely and roughly at right angles to the direction T of translation.

The end part 4c of the coil spring 4 has, at 5, an indexing arrangement produced in the form of an orifice through which an elastic pin 6 can pass. The elastic pin 6 can be positioned in one of the three orifices 7, 8 or 9 to position the end 4c of the spring with respect to the spring retainer 3.

Because the coil spring bears on the lower spring retainer 3 along the line 10, the spring can be shifted into a position corresponding to the orifice 7 or to the orifice 9 while at the same time keeping the line 10 pressing against the lower spring retainer 3.

This first embodiment allows the position of the spring to be adjusted with respect to the axis of the shock absorber in a simple and economical way, for example by shifting the end 4c using a mallet until it is in the chosen position corresponding to the desired adjustment of the inclination of the spring with respect to the axis of the shock absorber once the elastic pin 6 has been extracted.

Figure 4:
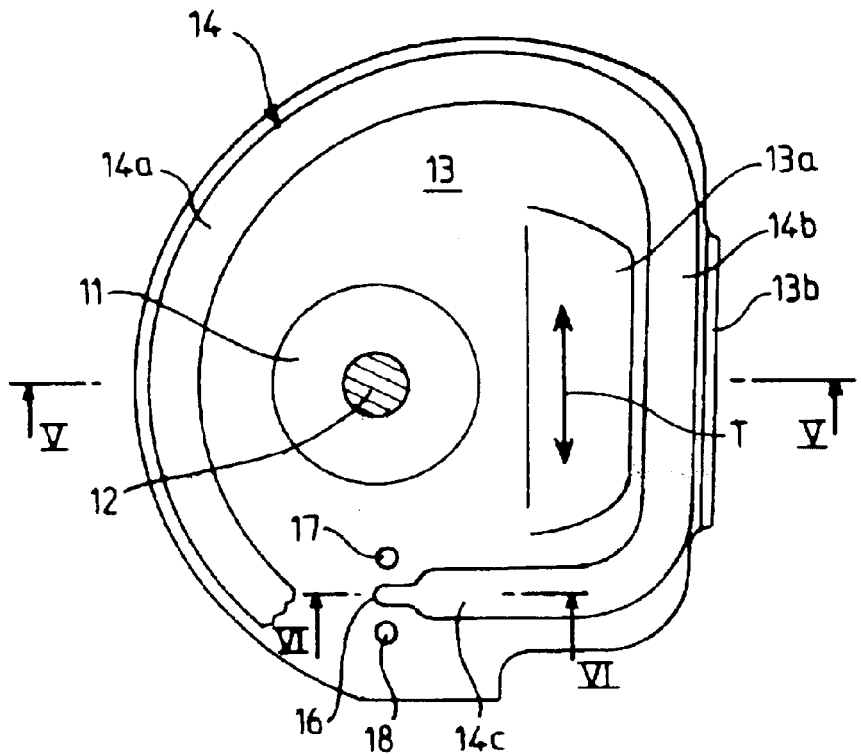
FIG. 4 diagrammatically depicts a view in the direction of arrow IV of FIG. 5 of a second embodiment of the invention.
Figures 5, 6:
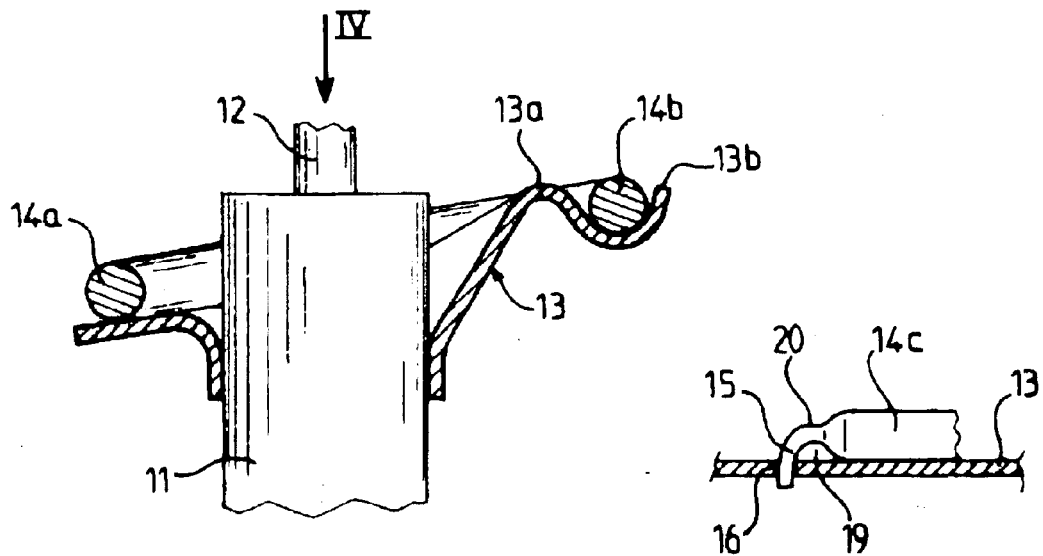
FIG. 5 diagrammatically depicts a view in section on the line V—V of FIG. 4 of the second embodiment of the invention.
FIG. 6 diagrammatically depicts a view in section on the line VI—VI of FIG. 4 of the second embodiment of the invention.

FIGS. 4 to 6 show a MacPherson suspension strut comprising a shock absorber with a body 11 and a rod 12, a lower spring retainer 13 secured to the shock absorber body 11, a coil spring 14 bearing on the lower spring retainer 13 and mounted between the lower spring retainer 13 and an upper spring retainer, not depicted.

The coil spring 14 has a circular end 14a, a straight end 14b and a curved end 14c roughly perpendicular to the straight end 14b. The straight end 14b is guided in translation in the direction T by a channel determined by two raised parts 13a and 13b of the lower spring retainer 13.

The end 14c roughly perpendicular to the direction of translation T has a curved and preferably tapered end 15. The curved end 15 can be inserted in an indexing orifice 16 chosen from the three orifices 16, 17 and 18 made in the lower spring retainer 13.

To move the spring 14 from one chosen position to another indexing position, a tool is inserted into the space 19 to lift the curved end 15 of the spring 14 and move it into a chosen position. Pressure is then exerted on the outer edge 20 of the bent end 15 to insert this end 15 into an orifice 17 or 18.

Figure 7:
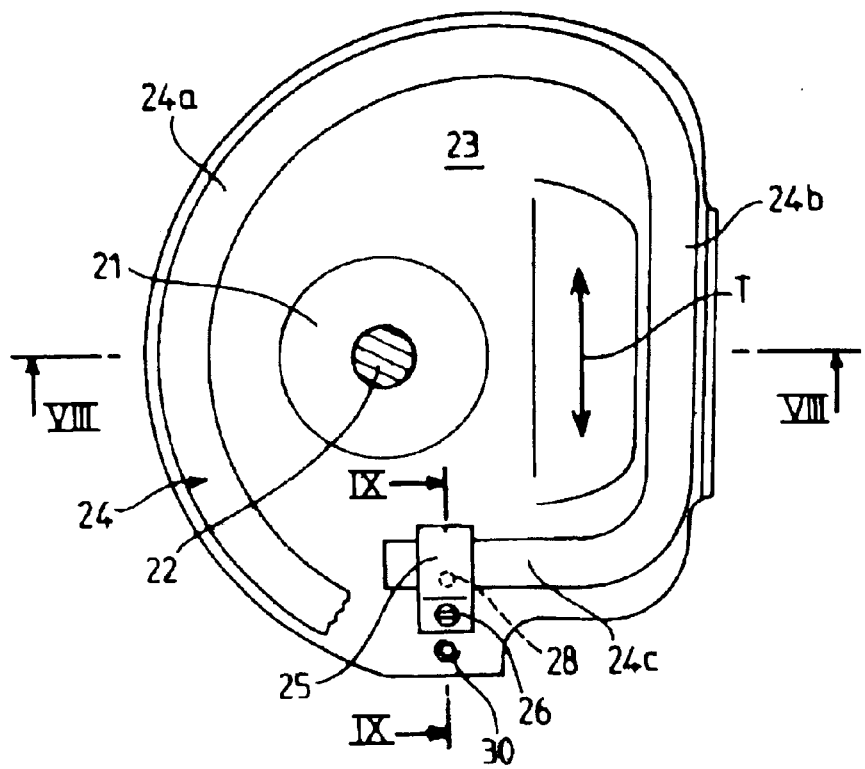
FIG. 7 diagrammatically depicts a view in the direction of arrow VII of FIG. 8 of a third embodiment of the invention.
Figures 8, 9:
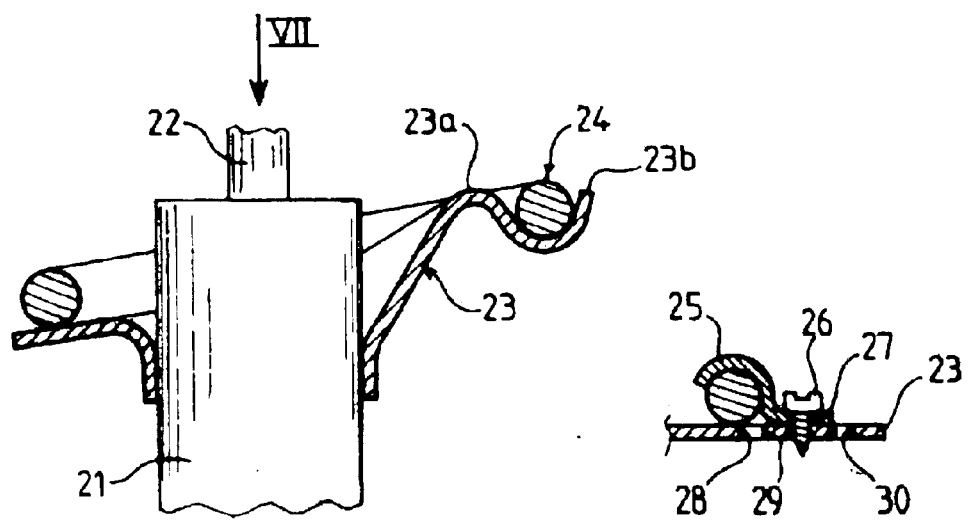
FIG. 8 diagrammatically depicts a view in section on the line VIII—VIII of FIG. 7 of the third embodiment of the invention.
FIG. 9 diagrammatically depicts a view in section on the line IX—IX of FIG. 7 of the third embodiment of the invention.

With reference to FIGS. 7 to 9, a MacPherson suspension strut comprises a shock absorber with a body 21 and a rod 22, a lower spring retainer 23 secured to the body of the shock absorber and a coil spring 24 mounted between the lower spring retainer 23 and an upper spring retainer, not depicted.

The spring 24 has a helical portion 24a, a straight portion 24b and an end 24c roughly perpendicular to the straight end 24b. The straight end 24b is guided in translation in the direction T by a configuration forming a translation channel delimited by a wave shape 13a and a rim 23b.

All that is required to move the spring 24 is for the end 24c to be moved in translation in the direction T. The end 24c is secured to the spring retainer 23 by a means 25 at least partially surrounding the end 24c. This means 25 preferably has a collar or curved-tab configuration capable of being fixed removably to the lower spring retainer 23. To do this, use is made, for example, of a screw 26, or a pin, or a bolt, or any other similar mechanical fastening means such as a rivet.

The screw 26 is screwed into an orifice 27 in the end of the curved tab 25 and into a corresponding hole or tapping 28, 29 or 30 made in the lower spring retainer 23.

Adjustment in this embodiment can be carried out in a similar way to the way described with reference to the first embodiment of FIGS. 1 to 3, such as by using a mallet or some other appropriate instrument able to make the spring 24 move. The screw 26 can be partially loosened to allow prior geometric adjustment, before the spring 24 is fastened in position using the curved tab 25.

The spring 4, 14 or 24 has a configuration that allows it to be moved in translation in a predetermined direction corresponding to it being guided by a corresponding configuration of the lower spring retainer 3, 13 or 23.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

All of the documents cited throughout the specification are incorporated herein by reference.

We claim:

1. A MacPherson strut for a MacPherson wheel suspension, comprising a shock absorber with a body (1, 11, 21) and a rod (2, 12, 22); said rod (2, 12, 22) being surrounded by a coil spring (4, 14, 24); said coil spring (4, 14, 24) being mounted between a lower spring retainer (3, 13, 23) non-pivotally secured to the shock absorber body (1, 11, 21) and an upper spring retainer through which the shock absorber rod passes; wherein said MacPherson strut comprises means capable of immobilizing a first turn of the spring (4, 14, 24) on and with respect to the lower spring retainer (3, 13, 23) in a plurality of predetermined positions on the lower spring retainer (3, 13, 23), said predetermined positions defining a direction of translation that allows adjustment of an inclination of the spring with respect to an axis of the shock absorber.

2. The strut according to claim 1, wherein the coil spring (4, 14, 24) has one end (4c, 14c, 24c) extending transversely to the direction (T) of translation defined by the various predetermined positions and has a part (4b, 14b, 24b) which is roughly straight and parallel to the direct of translation.

3. The strut according to claim 2, wherein said one end (4c, 14c) of said spring (4, 14) extending transversely to the direction (T) of translation has an indexing configuration (5, 15).

4. The strut according to claim 3, wherein said indexing configuration involves at least one orifice (5) through which a mechanical means (6) of connection to the lower spring retainer (3) can pass.

5. The strut according to claim 3, wherein said indexing configuration involves at least one curved end (15) which can be inserted in an indexing orifice (16 to 18) chosen from a number of orifices (16 to 18) made in the lower spring retainer (13).

6. The strut according to claim 1 wherein said end (24c) of the spring (24) extending transversely to the direction (T) of translation can be secured to the lower spring retainer (23) by a means (25) at least partially surrounding said end (24c).

7. The strut according to claim 6, wherein said means (25) at least partially surrounding said end (24c) of the spring (24) is configured as a collar or curved tab.

8. The strut according to claim 7, wherein said collar or curved-tab configuration (25) has an end for fixing, by a mechanical coupling means (26), to said lower spring retainer (23).

9. The strut according to claim 4, wherein the mechanical means (26) of coupling to the lower spring retainer (23) is a replaceable means of the screw, pin, bolt or similar type.

10. The strut according to claim 2, characterized in that said straight part (4b, 14b, 24b) parallel to the direct (T) of the translation is parallel to the direction of forward travel of a vehicle for which the strut is intended.

* * * * *